No. 12,460.
REISSUED FEB. 27, 1906.
W. A. DOBLE.
NOZZLE FOR IMPACT WATER WHEELS.
APPLICATION FILED FEB. 17, 1904.
2 SHEETS—SHEET 1.
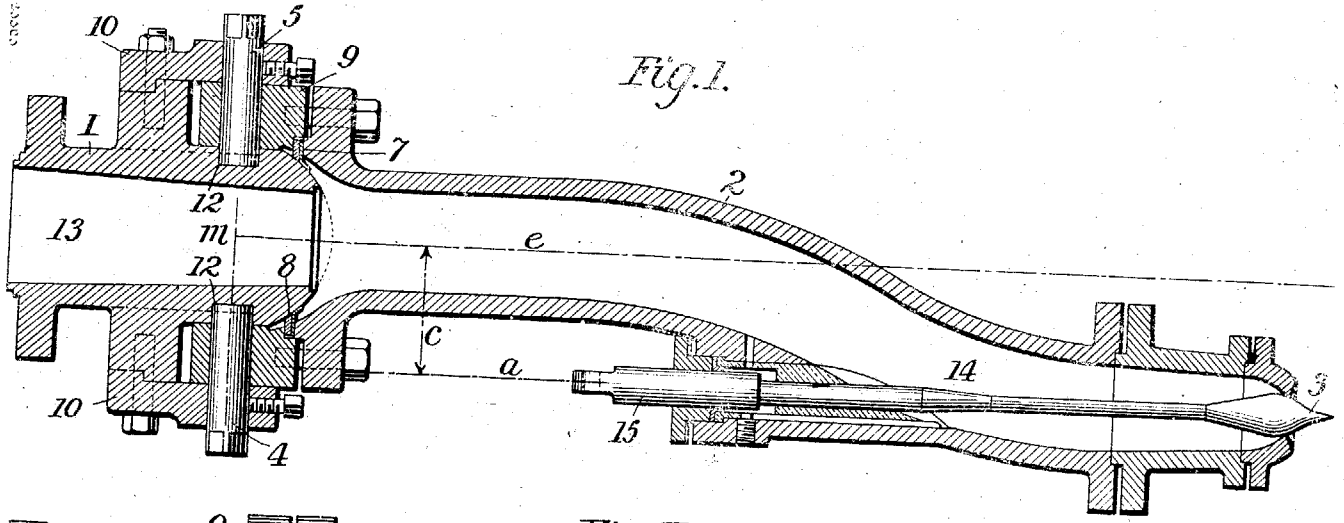
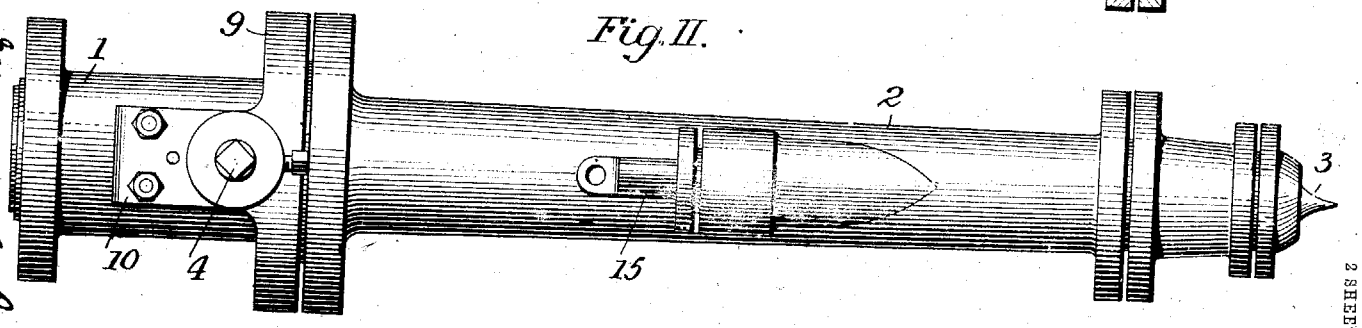
Witnesses
J. G. Stinkel
A. M. Gillman Jr.
By
Inventor:
William A. Doble,
J. Richards & Co.,
Attorneys No. 12,460.
REISSUED FEB. 27, 1906.
W. A. DOBLE.
NOZZLE FOR IMPACT WATER WHEELS.
APPLICATION FILED FEB. 17, 1904.
2 SHEETS—SHEET 2.
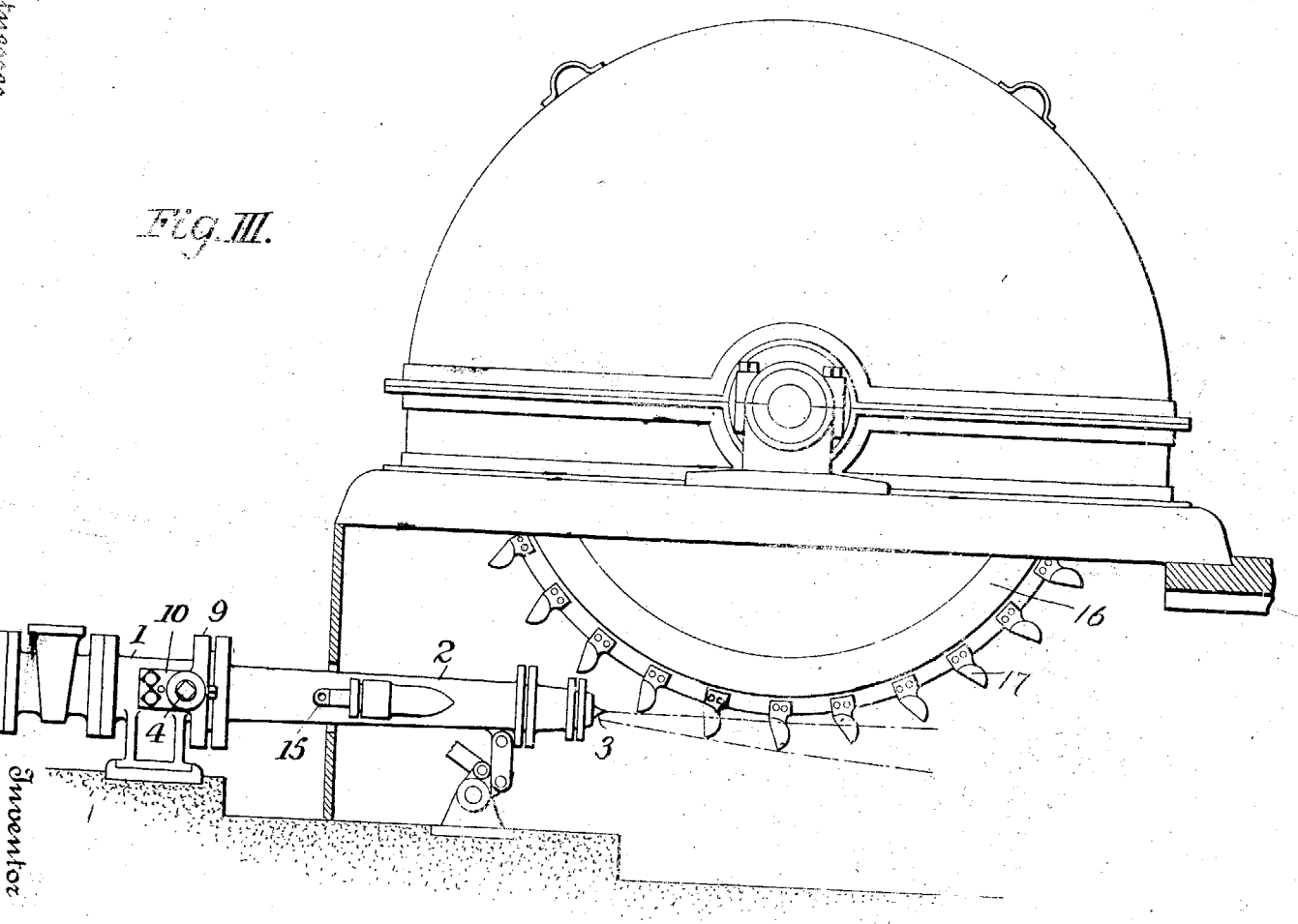
Fig. III.
Witnesses
J. G. Stinkel
A. M. Gilman, Jr.
Inventor
Wm. A. Doble
By C. A. Foster
Attorney

UNITED STATES PATENT OFFICE.

WILLIAM A. DOBLE, OF SAN FRANCISCO, CALIFORNIA.

NOZZLE FOR IMPACT WATER-WHEELS.

No. 12,460. Specification of Reissued Letters Patent. Reissued Feb. 27, 1906.

Original No. 751,722, dated February 9, 1904. Application for reissue filed February 17, 1904. Serial No. 194,106.

*To all whom it may concern:*

Be it known that I, WILLIAM A. DOBLE, a citizen of the United States, residing at San Francisco, county of San Francisco, and State of California, have invented certain new and useful Improvements in Nozzles for Impact Water-Wheels; and I hereby declare the following to be a full, clear, and exact description of the same, reference being had to the accompanying drawings, forming a part of this specification.

My invention relates to hydraulic nozzles and the manner of mounting and adjusting the same to avoid unbalanced reaction due to water-pressure when the nozzles or pipes are curved or of sinuous form, and especially relates to that class of deflectable nozzles having devices for controlling the quantity of water discharged, as in the case of an invention described in Letters Patent of the United States No. 660,789, granted to me October 30, 1900, for improvements in hydraulic regulating-nozzles.

The object of my invention is to relieve pivoted or deflecting nozzles from reactive or other strains that would interfere with sensitive control of such nozzles when they are deflected, as will hereinafter be more fully explained, and illustrated by the drawings forming a part of the specification.

My invention is especially adapted to such nozzles when applied to driving tangential water-wheels, and for that reason I shall describe it as so applied; but it will be evident that the invention is not limited to use in connection with such wheels, it being applicable to other uses as well.

In the drawings, Figure 1 is a plan view in section of a deflecting hydraulic nozzle arranged to operate in accordance with my invention, and Fig. 2 a side view of the same nozzle. Fig. 3 is a side elevation showing the relative arrangement of the nozzle and wheel.

In regulating the speed and power of tangential water-wheels when the water is applied to the buckets of the wheel about perpendicularly to the same by jet-nozzles and through long lines of pipes in which the momentum of the moving water does not permit a rapid or abrupt change of volume or velocity for the purpose of regulation this latter is performed by deflecting from the wheel-buckets or other object of impact such portion of the water as is not required for useful effect. To attain sensitive and effectual regulation by means of deflecting-nozzles, it is necessary that these be placed in equilibrium or relieved from resistance to the action of regulators or governors which are not capable of exerting much force without interfering with their precision and uniform action. When these nozzles are provided with jet-controllers, as usual, said nozzles must be so bent or curved as to permit the controller to be forward of the pivot, so that the stem of the controller can extend rearwardly through the nozzle-casing at a point forward of the joint, and this prevents the joint from being in line with the controller, but requires it to be at one side of the same. Heretofore in such cases the pivot-pin has been in a plane perpendicular to the plane in which the nozzle is bent, so that the line of reactive force has been in a plane at one side and parallel to that of the pivot and has tended to swing the nozzle about its axis, requiring means to resist this tendency to be employed. If, however, this reactive force due to the weight of water discharged falls within the plane of or directly upon the pivoting devices and the weight of the nozzle is balanced, there will be no tendency to a turning movement about the pivotal axis, and the nozzle will be in equilibrium, except as to friction of the pivotal bearing.

The nozzle illustrated is drawn from an example intended for a pressure of eight hundred pounds per inch of area, and a jet two inches in diameter would produce a reactive force of more than two thousand five hundred pounds, which would produce a turning strain if there was a vertical axis at right angles to the axis *m* in Fig. 1, measurable by a radius equal to the line *c*, or as the distance between the lines *e* and *a*. I overcome this by placing the pivot-pin at right angles to the line of discharge from the supply-pipe and in the plane in which the nozzle is bent in the following manner: 1 is the water-supply pipe, and 2 the nozzle pipe or casing, the latter made of a sinuous or double-curved form and provided with a movable central core-piece 3, as described in Letters Patent No. 660,789, granted to me on the 30th day of October, 1900, and before referred to. The supply-pipe is set on the line *e* at one side of the plane of the water-wheel 16, provided with the usual buckets 17, on the line *a* a distance equal to the length of the line *c*, corresponding to the sinuosity of the nozzle-pipe 2, and this nozzle-pipe is pivoted to the supply-pipe in the plane of its sinuosity. By thus pivoting the nozzle-pipe 2 in the plane of its sinuosity and not in the opposite plane, as has been hitherto done, the reactive thrust from the discharged water on the line *a* falls in the plane of the trunnion 4, as seen in Fig. 1, so that the nozzle has no resistance to movement in a plane perpendicular to the plane of its sinuosity except weight and inconsiderable friction on the trunnions 4 and 5 and the cup-leather packing 7, that fits on the spherical face 8.

The nozzle-pipe 2 is attached to the member 9, that turns on the trunnion-pins 4 and 5, having their bearing in the removable caps 10, also at 12 in the casing of the main casing 13, that forms a section of the supply-pipe.

The core-piece 3 is operated by a regulating device of any suitable kind connecting to the stem 14, that is by preference enlarged at 15 to form a hydrostatic piston, which by its outward thrust balances that upon the core-piece 3.

I do not here claim, broadly, the combination of a curved and pivoted nozzle provided with means for regulating the discharge arranged in advance of the pivot, as this is the subject of a separate application filed October 17, 1903, Serial No. 177,447.

Having thus described the nature and objects of my invention and the manner of applying the same, what I claim as new, and desire to secure by Letters Patent, is—

1. A hydraulic apparatus consisting of an impact-wheel with buckets, a nozzle-pipe of sinuous or double-curved form for directing a stream of water upon the buckets of said wheel, means for varying the amount of water discharged from said nozzle, and a supply-pipe to which said nozzle-pipe is pivoted on an axis in the plane of its sinuosity, said plane and axis being substantially parallel to the axis of the said impact-wheel, substantially as specified.

2. A hydraulic apparatus consisting of an impact-wheel, a nozzle rigid throughout, of curved form, for directing a stream upon said wheel, means for varying the amount of discharge from the tip of the nozzle, a supply-pipe, and a pivot connecting the nozzle and pipe, the axis of the pivot at right angles to the direction of flow at the axial point and located in the plane of the bend of the nozzle.

3. A hydraulic apparatus consisting of an impact-wheel, a nozzle rigid throughout and of curved form for directing a stream upon said wheel, means for varying the amount of discharge from the tip of the nozzle, a supply-pipe, and a pivot connecting the nozzle and pipe, the axis of movement of the nozzle being at right angles to the direction of flow at the axial point and located in the plane of the bend of the nozzle.

4. In a hydraulic apparatus for an impact-wheel provided with buckets and in which a jet from a pivoted nozzle is projected against the buckets in a plane perpendicular to the vertical plane of the axis of the wheel, the combination with a fluid-supply pipe, of a nozzle pivotally mounted at two diametrically opposite points outside the bore of said supply-pipe, said nozzle being bent or curved forward of the supply-pipe in the same plane as that occupied by its said pivotal points, and means arranged forward of said pivotal points for regulating the jet discharged by the nozzle.

5. In a hydraulic apparatus in which a bent rigid nozzle is provided with a valve regulating the discharge at the tip, the combination with said nozzle and valve, and with a main supply-pipe, of a pivot connecting the nozzle and pipe and located at right angles to the direction of flow at the axial point and in the plane of the bend of the nozzle.

6. A hydraulic apparatus consisting of an impact-wheel, a nozzle of sinuous or double-curved form for directing a stream upon the wheel, means for varying the amount of discharge from the nozzle, and a supply-pipe to which said nozzle is pivoted on an axis in the plane of its sinuosity, said plane and axis being substantially parallel to the axis of the said impact-wheel.

7. A hydraulic apparatus consisting of an impact-wheel, a nozzle rigid throughout, of curved form, for directing a stream upon said wheel, means for varying the amount of discharge from the tip of the nozzle, a supply-pipe, and a pivot connecting the nozzle and pipe, the axis of the pivot at right angles to the direction of flow at the axial point and located in the plane of the bend of the nozzle, and said plane parallel to that of the axis of the wheel.

8. A hydraulic apparatus consisting of an impact-wheel, a nozzle of sinuous or double-curved form for directing a stream upon said wheel, means for varying the amount of discharge from the nozzle, and a supply-pipe with which the nozzle has pivotal relation, the axis of movement of the nozzle located in the plane of the sinuosity of the nozzle.

In testimony whereof I have signed my name to this specification in the presence of two subscribing witnesses.

WILLIAM A. DOBLE.

Witnesses:
J. T. GILLON,
T. F. LYNCH.